US006769176B2

(12) United States Patent
Hornby

(10) Patent No.: US 6,769,176 B2

(45) Date of Patent: Aug. 3, 2004

(54) METHOD OF MANUFACTURING A FUEL INJECTOR

(75) Inventor: Michael J. Hornby, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/097,620

(22) Filed: Mar. 15, 2002

(65) Prior Publication Data

US 2002/0092933 A1 Jul. 18, 2002

Related U.S. Application Data

(62) Division of application No. 09/664,075, filed on Sep. 18, 2000, now Pat. No. 6,481,646.

(51) Int. Cl.[7] ........................... B21D 51/16; B23P 17/00

(52) U.S. Cl. ................ 29/890.09; 29/592.1; 29/890.01; 29/890.02; 29/890.142; 219/121.64; 239/533.2; 239/585.1; 239/585.2; 239/600

(58) Field of Search ........................... 29/592.1, 890.01, 29/890.02, 890.09, 890.142; 239/585.1, 585.5, 600, 533.2; 219/121.64

(56) References Cited

U.S. PATENT DOCUMENTS

| | | | | |
|---|---|---|---|---|
| 3,567,135 | A | 3/1971 | Gebert | |
| 4,342,427 | A | 8/1982 | Gray | 239/585 |
| 4,520,962 | A | 6/1985 | Momono et al. | 239/585 |
| 4,552,312 | A | 11/1985 | Ohno et al. | 239/585 |
| 4,597,558 | A | 7/1986 | Hafner et al. | 251/129.15 |
| 4,662,567 | A | 5/1987 | Knapp | 239/585 |
| 4,875,658 | A | 10/1989 | Asai | |
| 4,915,350 | A | 4/1990 | Babitzka et al. | 251/129.15 |
| 4,944,486 | A | 7/1990 | Babitzka | 251/129.21 |
| 4,946,107 | A | 8/1990 | Hunt | 239/585 |

(List continued on next page.)

FOREIGN PATENT DOCUMENTS

| | | |
|---|---|---|
| WO | WO9805861 | 2/1998 |
| WO | WO 00/06893 | 2/2000 |

*Primary Examiner*—Peter Vo
*Assistant Examiner*—Paul D Kim

(57) ABSTRACT

A method of manufacturing a fuel injector is disclosed. The method includes assembling a power group assembly with a valve group assembly to form the fuel injector. The power group assembly includes an overmold formed over a coil assembly. The valve group assembly includes a tube assembly formed by connecting an inlet tube to a valve body. The valve body includes a seat, a lower guide, and an armature/ball assembly disposed within the valve body. A retention member can be used to retain the power group assembly to the valve group assembly.

7 Claims, 6 Drawing Sheets

U.S. PATENT DOCUMENTS

| | | | | | |
|---|---|---|---|---|---|
| 4,984,744 | A | | 1/1991 | Babitzka et al. | 239/585 |
| 4,991,557 | A | | 2/1991 | DeGrace et al. | 123/470 |
| 5,038,738 | A | | 8/1991 | Hafner et al. | 123/470 |
| 5,054,691 | A | | 10/1991 | Huang et al. | 239/585 |
| 5,058,554 | A | | 10/1991 | Takeda et al. | 123/456 |
| 5,076,499 | A | | 12/1991 | Cranford | 239/585 |
| 5,127,585 | A | | 7/1992 | Mesenich | 239/585.5 |
| 5,155,326 | A | * | 10/1992 | Whims et al. | 219/121.64 |
| 5,167,213 | A | | 12/1992 | Bassler et al. | 123/470 |
| 5,190,221 | A | | 3/1993 | Reiter | 239/463 |
| 5,211,341 | A | | 5/1993 | Wieczorek | 239/585 |
| 5,236,174 | A | | 8/1993 | Vogt et al. | 251/129.21 |
| 5,263,648 | A | | 11/1993 | Vogt et al. | 239/585 |
| 5,275,341 | A | | 1/1994 | Romann et al. | 239/585.4 |
| 5,340,032 | A | | 8/1994 | Stegmaier et al. | 239/575 |
| 5,462,231 | A | | 10/1995 | Hall | 239/585.4 |
| 5,494,224 | A | | 2/1996 | Hall et al. | 239/585.5 |
| 5,494,225 | A | | 2/1996 | Nally et al. | 239/585.5 |
| 5,520,151 | A | | 5/1996 | Gras et al. | 123/470 |
| 5,544,816 | A | | 8/1996 | Nally et al. | 239/585.5 |
| 5,566,920 | A | | 10/1996 | Romann et al. | 251/129.21 |
| 5,580,001 | A | | 12/1996 | Romann et al. | 239/585.4 |
| 5,678,767 | A | * | 10/1997 | Rahbar | 239/533.2 |
| 5,692,723 | A | | 12/1997 | Baxter et al. | 251/129.21 |
| 5,718,387 | A | | 2/1998 | Awarzamani et al. | 239/585.1 |
| 5,732,888 | A | | 3/1998 | Maier et al. | 239/585.1 |
| 5,755,386 | A | | 5/1998 | Lavan et al. | 239/585.4 |
| 5,769,391 | A | | 6/1998 | Noller et al. | 251/129.21 |
| 5,769,965 | A | | 6/1998 | Liedtke et al. | 148/121 |
| 5,775,355 | A | | 7/1998 | Maier et al. | 137/15 |
| 5,775,600 | A | | 7/1998 | Wildeson et al. | 239/585.4 |
| 5,875,972 | A | * | 3/1999 | Ren et al. | 239/463 |
| 5,875,975 | A | | 3/1999 | Reiter et al. | 239/585.1 |
| 5,901,688 | A | | 5/1999 | Balsdon et al. | 123/516 |
| 5,915,626 | A | | 6/1999 | Awarzamani et al. | 239/135 |
| 5,927,613 | A | | 7/1999 | Koyanagi et al. | 239/585.1 |
| 5,937,887 | A | | 8/1999 | Baxter et al. | 137/15 |
| 5,944,262 | A | | 8/1999 | Akutagawa et al. | 239/585.4 |
| 5,975,436 | A | | 11/1999 | Reiter et al. | 239/585.1 |
| 5,979,411 | A | | 11/1999 | Ricco | 123/469 |
| 5,979,866 | A | | 11/1999 | Baxter et al. | 251/129.21 |
| 5,996,227 | A | | 12/1999 | Reiter et al. | 29/888.45 |
| 5,996,910 | A | | 12/1999 | Takeda et al. | 239/585.1 |
| 5,996,911 | A | | 12/1999 | Gesk et al. | 239/585.1 |
| 6,003,790 | A | | 12/1999 | Fly | 239/533.9 |
| 6,003,791 | A | * | 12/1999 | Reiter | 239/575 |
| 6,012,655 | A | | 1/2000 | Maier | 239/585.4 |
| 6,019,128 | A | | 2/2000 | Reiter | 137/549 |
| 6,027,049 | A | | 2/2000 | Stier | 239/585.1 |
| 6,039,271 | A | | 3/2000 | Reiter | 239/585.4 |
| 6,039,272 | A | | 3/2000 | Ren et al. | 239/597 |
| 6,045,116 | A | | 4/2000 | Willke et al. | 251/129.21 |
| 6,047,907 | A | | 4/2000 | Hornby | 239/585.1 |
| 6,076,802 | A | | 6/2000 | Maier | 251/129.21 |
| 6,079,642 | A | | 6/2000 | Maier | 239/585.1 |
| 6,089,467 | A | | 7/2000 | Fochtman et al. | 239/5 |
| 6,089,475 | A | | 7/2000 | Reiter et al. | 239/585.1 |
| 6,105,884 | A | * | 8/2000 | Molnar et al. | 239/585.1 |
| 6,135,360 | A | * | 10/2000 | Ren et al. | 239/136 |
| 6,168,098 | B1 | * | 1/2001 | Brinn, Jr. | 239/585.4 |
| 6,173,915 | B1 | * | 1/2001 | Cohen et al. | 239/585.1 |
| 6,179,227 | B1 | * | 1/2001 | Ren et al. | 239/497 |
| 6,186,421 | B1 | * | 2/2001 | Wahba et al. | 239/585.1 |
| 6,186,472 | B1 | | 2/2001 | Reiter | 251/129.1 |
| 6,201,461 | B1 | | 3/2001 | Eichendorf et al. | 335/256 |
| 6,264,112 | B1 | * | 7/2001 | Landschoot et al. | 239/5 |
| 6,328,232 | B1 | * | 12/2001 | Haltiner et al. | 239/585.1 |
| 6,334,580 | B2 | * | 1/2002 | Cohen | 239/585.4 |
| 6,386,467 | B1 | * | 5/2002 | Takeda | 239/585.5 |
| 6,409,101 | B1 | * | 6/2002 | D'Arrigo | 239/585.1 |
| 6,422,481 | B2 | * | 7/2002 | Ren et al. | 239/13 |
| 6,422,488 | B1 | * | 7/2002 | Fochtman et al. | 239/585.5 |
| 6,454,192 | B2 | * | 9/2002 | Perry | 239/585.1 |
| 6,508,418 | B1 | * | 1/2003 | Fochtman et al. | 239/585.4 |
| 2001/0017327 | A1 | | 8/2001 | Fochtman | 239/585.4 |
| 2001/0048091 | A1 | | 12/2001 | Enomoto et al. | 251/129.15 |

* cited by examiner

METHOD OF MANUFACTURING A FUEL INJECTOR

The present application is a divisional application filed pursuant to 35 U.S.C. §§120 and 121 and claims the benefits of prior application Ser. No. 09/664,075 filed Sep. 18, 2000, which is hereby incorporated by reference in its entirety.

BACKGROUND OF THE INVENTION

The present invention relates to fuel injectors and more particularly to a solenoid actuated fuel injector.

Prior known techniques in the design and manufacture of fuel injectors have been complex and cumbersome. The fuel injector valve body would typically be flipped a series of times before fabrication is completed. Additionally, the number of parts in the injector assembly, and in particular, the number of parts in the valve group affects several parameters including the material costs, the number of rotating work stations required to assemble the injector, and the speed at which the assembly can be fabricated. Further, the number of welds in an injector assembly also affects the equipment required to manufacture the injector, and the rate at which the injector can be assembled.

It would be beneficial to provide a fuel injector wherein the number of total parts comprising the fuel injector assembly is reduced, the assembly procedure requires no flipping of the valve body, and the number of rotating work stations along with the total number of total welds required to fabricate the injector is reduced.

SUMMARY OF THE INVENTION

Briefly, the present invention provides a solenoid actuated fuel injector. The solenoid actuated fuel injector comprises a valve group including a valve body having an upstream end, a downstream end and a longitudinal axis extending therethrough. The valve group additionally includes an inlet tube having an upstream end, a downstream end, and an inlet tube channel. The downstream end of the inlet tube is connected to the upstream end of the valve body. The inlet tube also includes at least one formed slot. The valve group further includes an armature/ball assembly reciprocally disposed in the valve body along the longitudinal axis. In addition, the downstream end of the inlet tube is spaced a predetermined distance from the upstream end of the armature/ball assembly.

The solenoid actuated fuel injector is further comprised of a power group including a coil assembly that cinctures the inlet tube, a housing that encases the coil assembly, and an overmold that encapsulates the housing and coil assembly. The overmold includes at least one overmold slot that is formed in the overmold. The power group is additionally comprised of a retainer that extends through the at least one overmold slot and the at least one inlet tube slot, the retainer retains the power group to the valve group.

The present invention also provides a further embodiment of a solenoid actuated fuel injector. The fuel injector comprises a valve body having an upstream end, a downstream end and a longitudinal axis extending therethrough. The embodiment additionally comprises an armature/ball assembly reciprocally disposed in the valve body along the longitudinal axis, and an inlet tube having an upstream end, a downstream end, and an inlet tube channel. The embodiment further includes a downstream end of the inlet being tube contiguous to the upstream end of the valve body, and a downstream end of the inlet tube being spaced a predetermined distance from the upstream end of the armature/ball assembly.

The present invention also provides a method of manufacturing a solenoid actuated fuel injector. The method comprises welding an upper surface of a ball seat to a lower surface of a lower guide, the welded surface of the ball seat to the lower surface of the lower guide providing a hermetic seal. The method includes loading an orifice disk, ball seat and lower guide into a downstream end of a valve body, welding the valve body to the ball seat, thus retaining the orifice disk, ball seat and lower guide in place in the downstream end of the valve body. The method further includes welding a ball to a downstream end of an armature stem forming an armature/ball assembly, and loading the armature/ball assembly through an upstream end of the valve body.

The method of manufacturing a solenoid actuated fuel injector additionally comprises pressing an inlet tube into the valve body a predetermined distance, welding the inlet tube to the valve body, thus securing the inlet tube to the valve body. The method includes pressing a power group comprised of a housing and coil subassembly onto the inlet tube, retaining the power group to the inlet tube by sliding a retainer through slots aligned in the power group and slots formed in the inlet tube. The method further includes installing first a spring, and second an adjusting tube a predetermined distance into a top end of the inlet tube, securing the adjusting tube in place after completing the installation. A combination retainer/fuel filter is pressed in an upstream end of the inlet tube, completing the assembly.

The present invention further provides a method of operating a solenoid actuated fuel injector comprising energizing a coil, generating an electromagnetic flux that flows from the coil to an inlet tube, from the inlet tube to a coil housing, from the coil housing to a valve body, from the valve body across a side air gap to an armature/ball assembly, from the armature/ball assembly across a working air gap back to the inlet tube. The method of operating the solenoid actuated fuel injector further includes displacing the armature/ball assembly a predetermined lift distance.

An alternate embodiment of the present invention provides a solenoid actuated fuel injector. The solenoid actuated fuel injector comprises a valve group including a valve body having an upstream end, a downstream end and a longitudinal axis extending therethrough. The valve group additionally includes an inlet tube having an upstream end, a downstream end, and an inlet tube channel. The downstream end of the inlet tube is connected to the upstream end of the valve body. The inlet tube also includes at least one formed slot. The valve group further includes an armature/ball assembly reciprocally disposed in the valve body along the longitudinal axis. In addition, the downstream end of the inlet tube is spaced a predetermined distance from the upstream end of the armature/ball assembly.

The alternate embodiment of the solenoid actuated fuel injector is further comprised of a power group including a coil assembly that cinctures the inlet tube and an overmold that encapsulates the coil assembly. The overmold includes at least one overmold slot that is formed in the overmold. The power group is additionally comprised of a retainer that extends through the at least one overmold slot and the at least one inlet tube slot, the retainer retains the power group to the valve group.

The alternate embodiment of present invention also provides a method of manufacturing a solenoid actuated fuel injector. The method comprises welding an upper surface of a ball seat to a lower surface of a lower guide, the welded surface of the ball seat to the lower surface of the lower guide providing a hermetic seal. The method includes loading an orifice disk, ball seat and lower guide into a downstream end of a valve body, welding the valve body to the ball seat, thus retaining the orifice disk, ball seat and lower guide in place in the downstream end of the valve body. The method further includes welding a ball to a downstream end of an armature stem forming an armature/ball assembly, and loading the armature/ball assembly through an upstream end of the valve body.

The method of manufacturing the alternate embodiment of the solenoid actuated fuel injector additionally comprises pressing an inlet tube into the valve body a predetermined distance, welding the inlet tube to the valve body, thus securing the inlet tube to the valve body. The method includes pressing a power group comprised of an overmolded coil subassembly onto the inlet tube, retaining the power group to the inlet tube by sliding a retainer through slots aligned in the power group and slots formed in the inlet tube. The method further includes installing first a spring, and second an adjusting tube a predetermined distance into a top end of the inlet tube, securing the adjusting tube in place after completing the installation. A combination retainer/fuel filter is pressed in an upstream end of the inlet tube, completing the assembly.

The alternate embodiment of the present invention further provides a method of operating a solenoid actuated fuel injector comprising energizing a coil, generating an electromagnetic flux that flows from the coil to an inlet tube, from the inlet tube across a coil air gap to a valve body, from the valve body across a side air gap to an armature/ball assembly, from the armature/ball assembly across a working air gap back to the inlet tube. The method of operating the solenoid actuated fuel injector further includes displacing the armature/ball assembly a predetermined lift distance.

BRIEF DESCRIPTION OF THE DRAWINGS

The accompanying drawings, which are incorporated herein, and constitute part of this specification, illustrate the presently preferred embodiments of the invention, and, together with the general description given above and the detailed description given below, serve to explain the features of the invention. In the drawings.

DESCRIPTION OF THE PREFERRED EMBODIMENT

Fuel injectors are used to provide a metered amount of fuel in an internal combustion engine. Details of the operation of the fuel injector 10 in relation to the operation of the internal combustion engine (not shown) are well known and will not be described in detail herein, except as the operation relates to the preferred embodiment. Although the preferred embodiment is generally directed to fuel injectors for internal combustion engines, those skilled in the art will recognize from present disclosure that the preferred embodiment can be adapted for other applications in which precise metering of fluids is desired or required.

Figure 1:
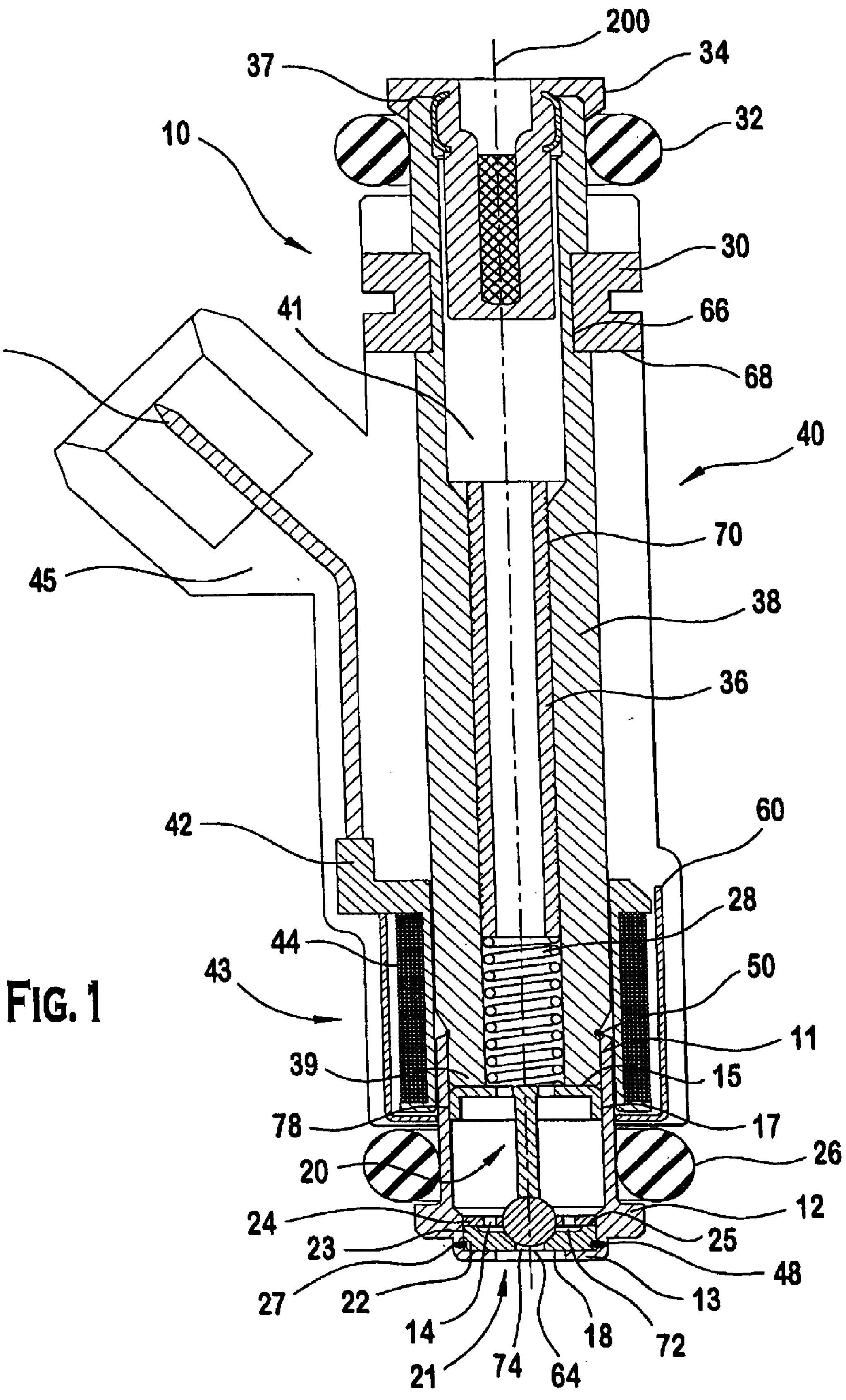
FIG. 1 is a side view, in section, of the fuel injector assembly according to a first preferred embodiment of the present invention.

Referring now to FIG. 1, there is shown the fuel injector 10, according to a first preferred embodiment. As used herein, like numerals indicate like elements throughout. The fuel injector 10 comprises a valve group assembly 21 that includes a valve body 12, having an upstream end 11, a downstream end 13, and a longitudinal axis 200 extending therethrough. The words "upstream" and "downstream" designate flow directions in the drawing to which reference is made. The upstream end is defined to mean in a direction toward the top of the figure referred, and the downstream end is defined to mean in a direction toward the bottom of the figure referred.

Figure 5:
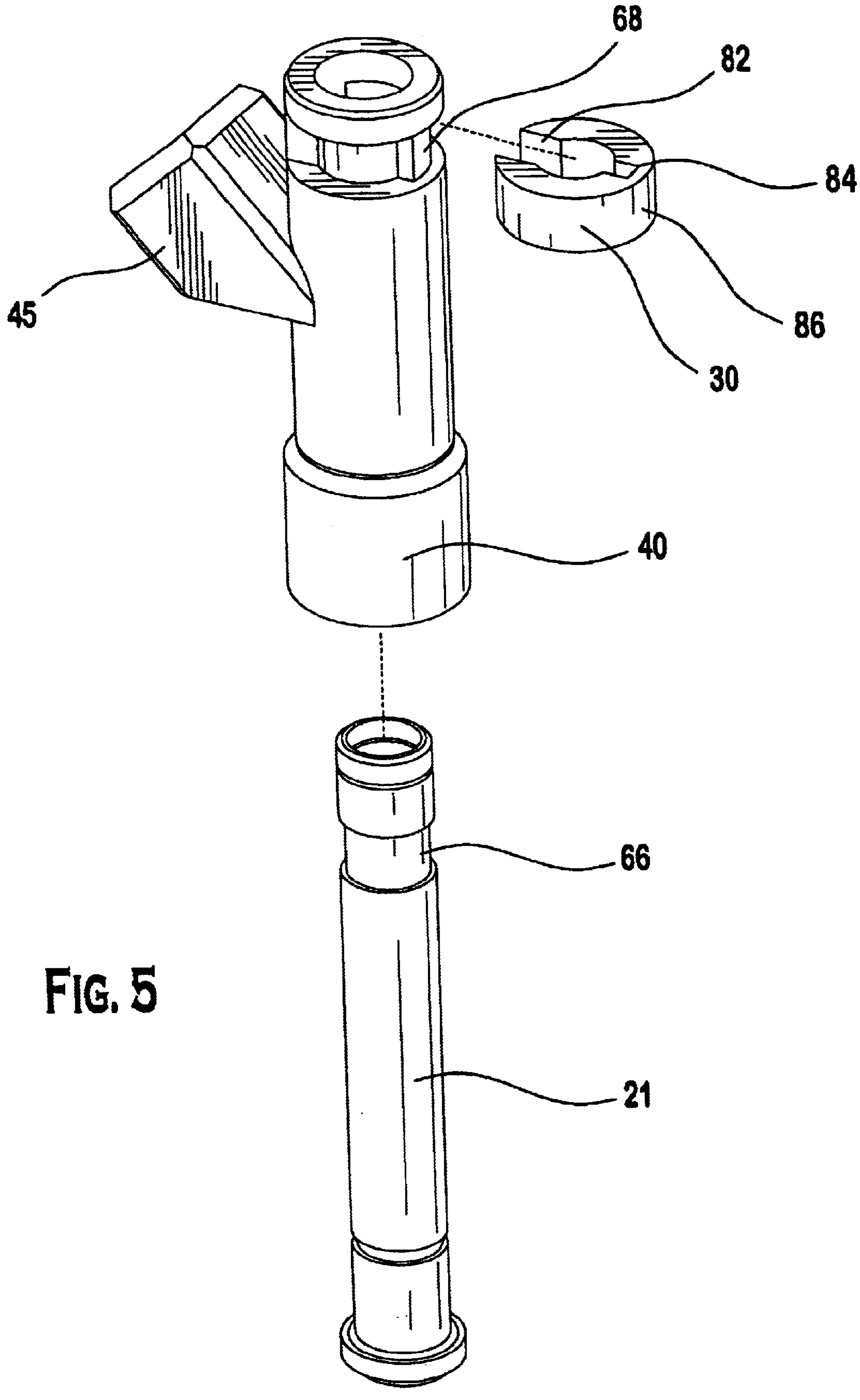
FIG. 5 is a perspective view of the exploded assembly of the valve group, power group, and retainer according to a preferred embodiment of the present invention.

The valve group 21 additionally includes an armature/ball assembly 20 that is reciprocally disposed within the valve body 12 along the longitudinal axis 200. The valve group 21 further includes an inlet tube 38, having an upstream end 37, a downstream end 39, an inlet tube channel 41, and a circular recessed slot 66 proximate the upstream end 37 as shown in FIG. 5. The downstream end 39 of the inlet tube 38 is connected to the upstream end 37 of the valve body 12 by a single hermetic laser weld 50. The inlet tube 38 being connected to the valve body 12 by the single hermetic laser weld 50 represents a preferred embodiment of the present invention. Those skilled in the art will recognize that the valve group 21 may include additional internal components connected between the valve body 12 and the inlet tube 38. Such parts can include a valve body shell, an upper eyelet guide, and a non-magnetic shell (all not shown), among others. It is at the heart of the present invention that the inlet tube 38 is contiguous to the valve body 12, thus eliminating the need for the additional internal components and welds.

The downstream end 39 of the inlet tube 38 is spaced a predetermined distance from the upstream end 19 of the armature/ball assembly 20. This predetermined distance represents the stroke of the armature/ball assembly 20. The stroke or predetermined distance can further be described as a working air gap 15. A spring 28, is disposed at a downstream end 39 of the inlet tube 38, upstream of the armature/ball assembly. An adjusting tube 36 is also disposed a predetermined distance into the channel 41 of the inlet tube 38. The adjusting tube 36 compresses the spring 28. The compression of the spring 28 biases the armature/ball assembly 20 to a closed position.

A ball seat 22 and a lower guide 24 are provided within the valve body 12. The lower guide 24 is located upstream from the ball seat 22. Both the lower guide 24 and ball seat 22 are located downstream of the armature/ball assembly 20 along the longitudinal axis 200. The lower guide 24 has a plurality of holes 14 that extend therethrough. The plurality of holes 14 in the lower guide 24 are disposed circumferentially about the longitudinal axis 200. The ball seat 22 has a generally recessed area 74 extending down from the upper surface 23 of the ball seat 22, and a generally circular opening 72 extending through the longitudinal axis 200. An upper surface 23 of the ball seat 22 and a lower surface 25 of the lower guide 24 are hermetically welded together (not shown).

The lower guide 24 guides a downstream end 62 of the armature/ball assembly 20, in the valve body 12, along the longitudinal axis 200. An orifice disk 18 is disposed within the valve body 12, downstream of the ball seat. An orifice 64 is provided within the orifice disk 18. The orifice 64 preferably extends through the geometric center of the orifice disk 18 along the longitudinal axis 200. However, those skilled in the art will recognize that the orifice can be offset from the axis 200. A weld 48 is located at the downstream end 13 of an outside diameter 27 of the valve body 12. The weld 48 extends through to the ball seat 22, retaining the ball seat 22, lower guide 24, and orifice disk 18 within the valve body 12.

A combination retainer/fuel filter 34 is disposed in the upstream end 37 of the inlet tube 38. The retainer/fuel filter 34 removes particulate (not shown) in the fuel that passes through the fuel injector 10. Particulate can damage and or negatively affect the function of the injector 10.

Figure 2:
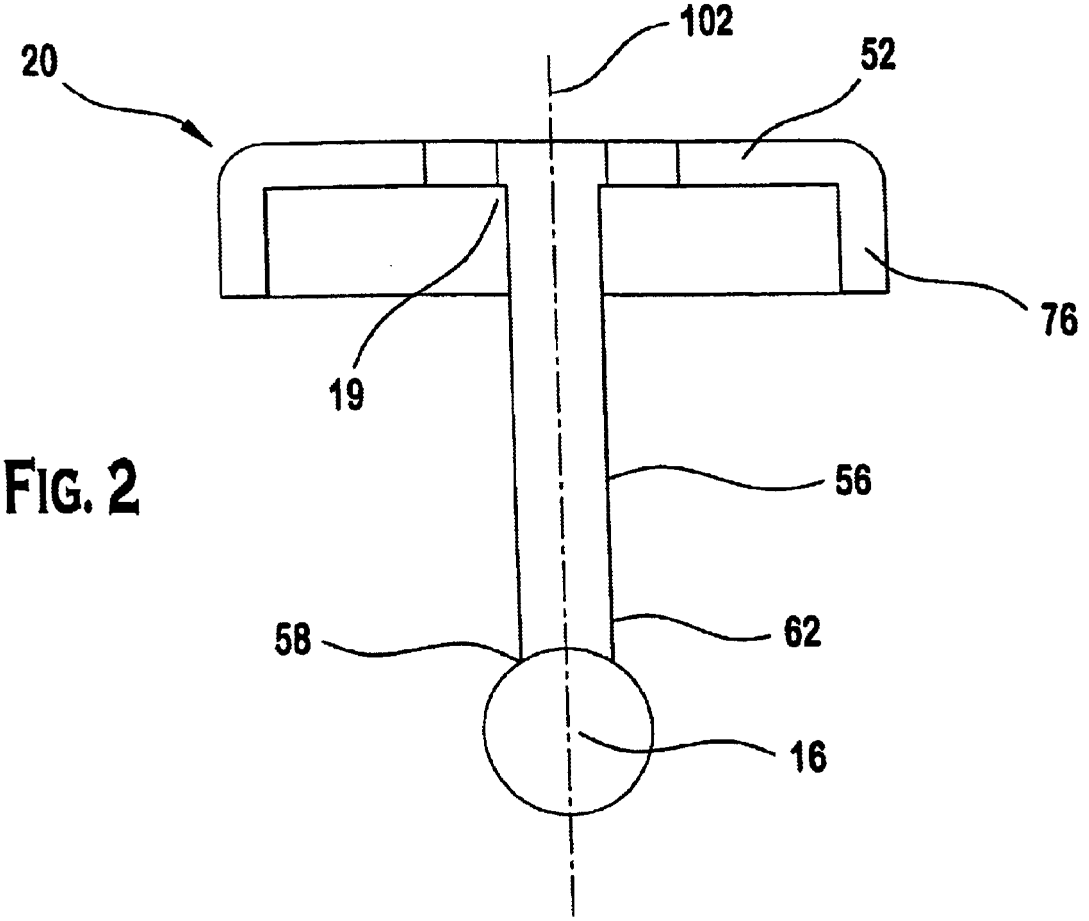
FIG. 2 is a side view, in section, of the armature assembly according to the present invention.

Referring now to FIG. 2, there is shown a more detailed view of the armature/ball assembly 20. The armature/ball assembly 20 is comprised of a ball 16 welded to the downstream end 62 of an armature stem 56. A generally planar, generally circular disk 52 extends radially from an upstream end 64 of the armature stem 56. A lip 76 extends downstream from the circular disk 52 proximate an interior wall 78 of the valve body 12. The interior wall 78 acts as an upper guide against the lip 76 of the armature/ball assembly 20. A side air gap 17 provides clearance for the lip 76 of the armature/ball assembly 20 and the interior wall 78 of the valve body 12. The interior wall 78 and the lower guide 24 guide the reciprocal operation of the armature/ball assembly 20 within the valve body 12 along the longitudinal axis 200.

Figure 3:
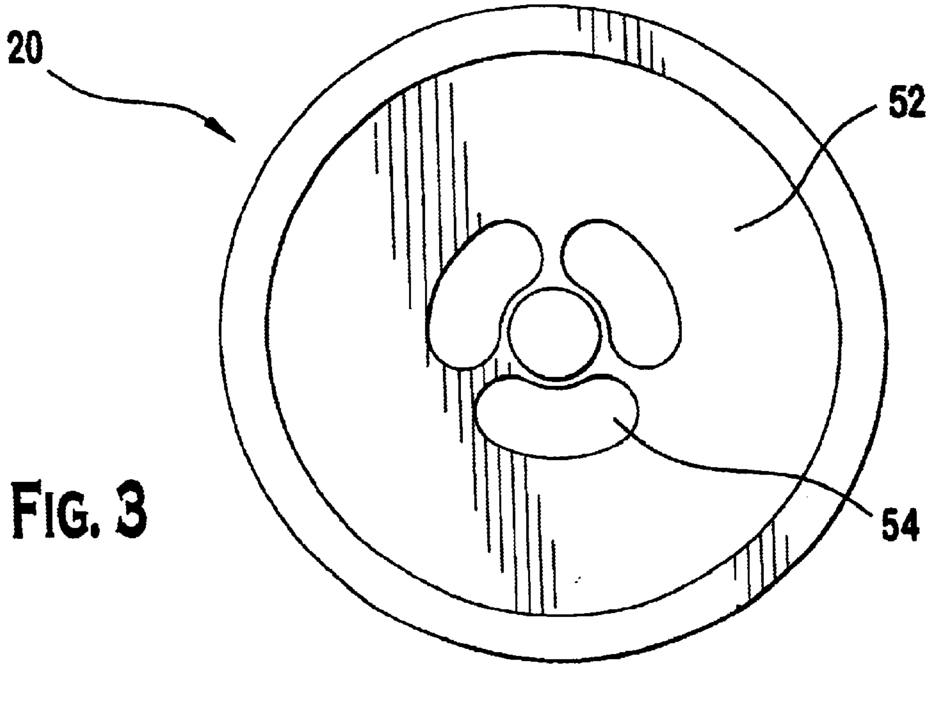
FIG. 3 is a top plan view of the armature according to the present invention.

Referring now to FIG. 3, there is shown a top plan view of the armature/ball assembly 20. The circular disk 52, further comprises a plurality of arcuate or kidney shaped openings 54. The arcuate or kidney shaped openings 54 extend through the disk 52 and are disposed circumferentially about a longitudinal axis 102 of the armature/ball assembly 20. In addition, as shown in FIG. 1, the openings 54 are located within the channel 41 of the inlet tube 38. It should be recognized by those skilled in the art that the shape of the openings could be round, square, triangular, or any shape, and should not limited to being arcuate or kidney shaped.

Referring back to FIG. 1, the fuel injector 10 further comprises a power group 40. The power group 40 includes a coil assembly 43 that cinctures the inlet tube 38. The coil assembly 43 is comprised of a plastic bobbin 42 formed with straight terminals 46. Coil wire 44 is wound around the plastic bobbin 42. The terminals 46 are bent to a desired position as shown in FIG. 1. A coil housing 60 encases the coil assembly 43. The coil assembly 43 and housing 60 is then overmolded with a plastic overmold 45 or any other equivalent formable material thereof.

Referring to FIG. 5, slots 68 are formed in the overmold 45 during the forming process. A c-clip retainer 30 made of a resilient material, is inserted through the circular slot 66 in the inlet tube 38 and the slots 68 in the overmold 45 to retain the power group 40 to the valve group 21. The retainer 30 has a longitudinal slot 82. The longitudinal slot 82 extends through the retainer 30 and stops a predetermined distance 84 from an outer wall 86 of the retainer 30. The slot 82 provides enough thickness to the outer wall 86 of the retainer 30 in order to enable the retainer 30 to be flexible enough to slide over the inlet tube 38. Those skilled in the art will recognize that the type of material used to construct the retainer 30 could include plastic, rubber, aluminum or any other flexible, light weight, strong, durable material. The design of the retainer 30 eases assembly and removal of the power group 40. The retainer 30 also allows the coil assembly 43 to be made and tested as a separate part, and then assembled to the valve group assembly 21. The retainer 30 and the overmold 45 are preferably color-coded (not shown) for proper group identification.

A method of manufacturing the fuel injector assembly 10 according to the preferred embodiment will now be described. The fuel injector assembly 10 is comprised of the power group assembly 40 and the valve group assembly 21. The valve group 21 is built as a subassembly. The first operation in the manufacture of the valve group 21 is to weld the upper surface 23 of the ball seat 22 to the lower surface 25 of the lower guide 24. Those skilled in the art will recognize that the injector assembly 10 can be assembled in an order other than described. By way of example, the method of manufacturing the injector assembly 10 may include installing the retainer/fuel filter 34 prior to installing the power group assembly 40. The orifice disk 18, ball seat 22 and lower guide 24 are loaded into the downstream end 13 of the valve body 12. The valve body 12 is then fixedly connected to the ball seat 22 with a weld 48. The weld 48 is formed by welding from the exterior of the valve body 12 through to the ball seat 22. The weld 48 is located at the downstream end 13 of the outside diameter 27 of the valve body 12. This weld 48 retains the orifice disk 18, ball seat 22 and lower guide 24 in the downstream end 13 of the valve body 12. The armature/ball assembly 20 is formed by welding the ball 16 to the downstream end 62 of the armature stem 56. The armature/ball assembly 20 is then loaded into the valve body 12 through the upstream end 11. The inlet tube 38 is then pressed into the valve body 12 a predetermined distance. Once the predetermined distance is set, the inlet tube 38 and the valve body 12 are welded together with the hermetic weld 50. The hermetic weld 50 is the only external hermetic weld required in the fuel injector 10. Due to the reduced number of parts and welds, only two rotary work stations (not shown) are needed to assemble the fuel injector 10 of the present invention.

The method of manufacturing the fuel injector 10 further includes pressing the power group 40 onto the inlet tube 38. The retainer 30 slides through slots 66 in the inlet tube 38 and matching slots 68 in the overmold 45 of the power group 40, thus retaining the power group 40 to the inlet tube 38. The spring 28 and then the adjusting tube 36 are loaded into the upstream end 37 of the inlet tube 38. The adjusting tube 36 is pressed down into the inlet tube 38 a predetermined distance. This distance determines the amount of pressure the spring 28 exerts on the upstream end 19 of the armature/ball assembly 20. After the adjusting tube 36 is set or calibrated to obtain a desired compression in the spring 28, the adjusting tube 36 is secured to the inlet tube 38. This is accomplished by crimping the adjusting tube 36 to the inlet tube 38 with crimps 70. Those skilled in the art of fuel injector manufacture understand the methods of making such crimps. The combination retainer/fuel filter 34 is then pressed into the upstream end 37 of the inlet tube 38. The final steps in the manufacture of the injector assembly 10 are the installation of an upper o-ring 32 and a lower o-ring 26. The lower o-ring 26 provides a liquid tight seal to the engine (not shown). The upper o-ring provides a liquid tight seal to the fuel supply (not shown).

Figure 4:
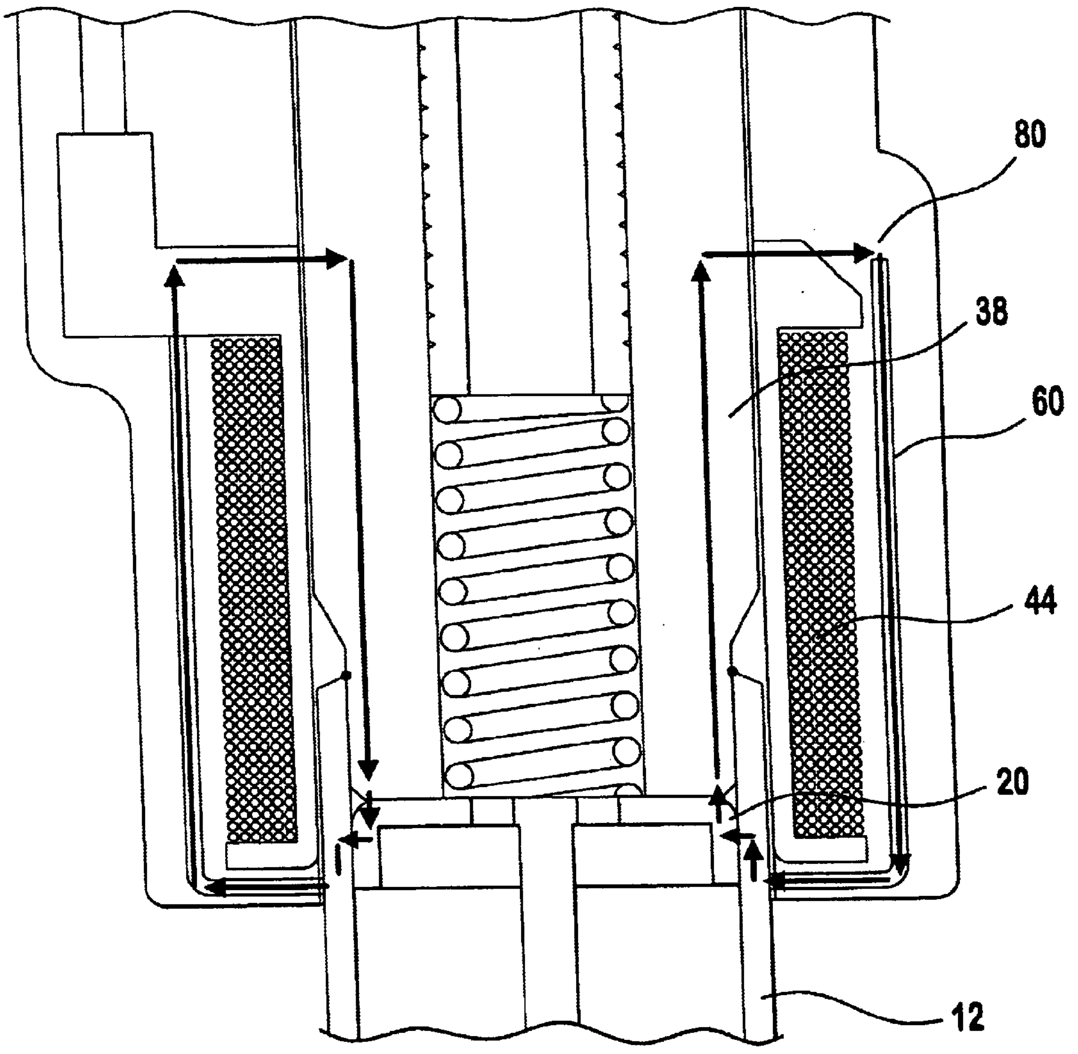
FIG. 4 is a side view, in section, of the flow of flux in the fuel injector assembly according to the first preferred embodiment of the present invention.

Operation of the injector 10 and the flow of fuel (not shown) through the injector assembly 10 will now be described. Fuel enters the injector assembly 10 through the retainer/fuel filter 34 at the upstream end 37 of the inlet tube 38. The fuel flows through the retainer/fuel filter 34 on into the inlet tube channel 41. From the inlet tube channel 41 the fuel flows on through the adjusting tube 36 and past the spring 28. Once past the spring 28, the fuel passes through the plurality of holes 54 in the disk 52 into the valve body 12. The fuel then flows through the plurality of holes 14 in the lower guide 24 and is estopped in the generally recessed area 74 of the ball seat 22 until the injector assembly 10 is energized. To discharge the fuel from the injector 10, the coil 44 is energized with a potential voltage (not shown). Referring now to FIG. 4, the coil 44 generates an electromagnetic flux 80 that flows from the inlet tube 38, to the coil housing 60, on to the valve body 12. The flux 80 then flows from the valve body 12, across the side air gap 17, to the armature/ball assembly 20, from the armature/ball assembly 20 across the working gap 15, back to the inlet tube 38. It should be noted, that if the polarity of the potential voltage is reversed, the flow of the flux 80 is, in turn, reversed. Once the coil 44 is energized and flow of the flux 80 passes through the armature/ball assembly 20, the electromagnetic force generated by the coil 44 draws the armature/ball assembly 20 upstream. This is done against the force of the spring 28. The armature/ball 20 assembly is displaced the distance of the working air gap 15 and guided by the interior wall 78 of the valve body 12 and lower guide 24 along the longitudinal axis 200. The fuel that was estopped in the recess 74 of the ball seat 22 is now free to flow through the circular hole 72 in the ball seat 22, through the orifice 64 and into the engine. When the potential voltage is removed from the coil 44, the electromagnetic flux 80 breaks down. The downward compressive force provided by the spring 28 forces the armature/ball assembly 20 to drop back into the ball seat 22, thus estopping the fuel.

Figure 6:
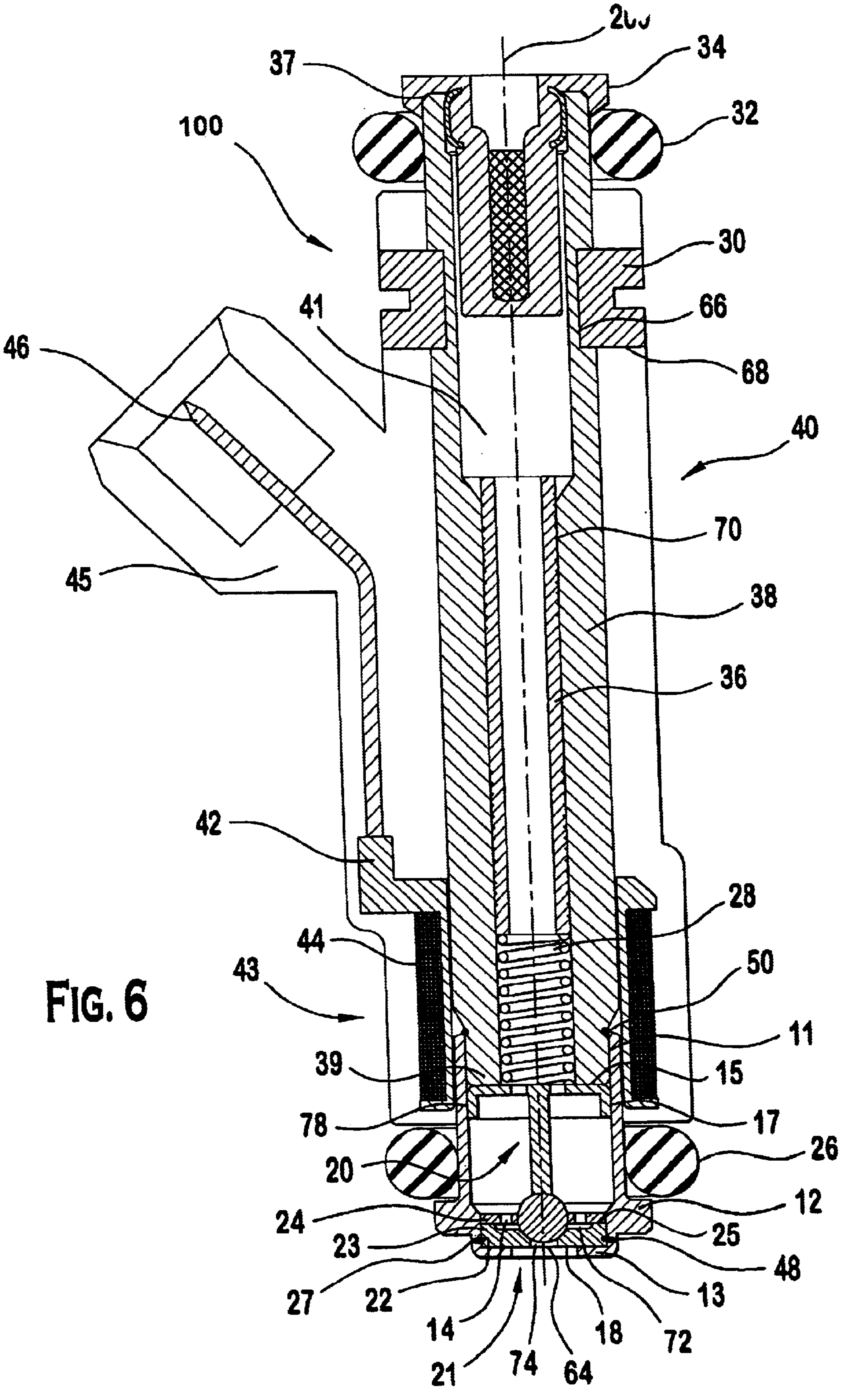
FIG. 6 is a side view, in section, of a second preferred embodiment of the fuel injector assembly according to the present invention.

FIG. 6 shows a second preferred embodiment of a fuel injector assembly 100. Fuel injector assembly 100 does not include the coil housing 60 encasing the coil assembly 43 of the power group 40 as shown in the first preferred embodiment of FIG. 1. The fuel injector assembly 100 requires less components to fabricate, and is therefore, less expensive to build. The method of manufacturing the fuel injector assembly 100 is the same as described above with respect to the first preferred embodiment, with the exception that the power group 40 does not include a coil housing 60. However, the fuel injector assembly 100 requires more input current in order to energize the coil 44 to generate the flux 80 needed to lift the armature/ball assembly 20.

Figure 7:
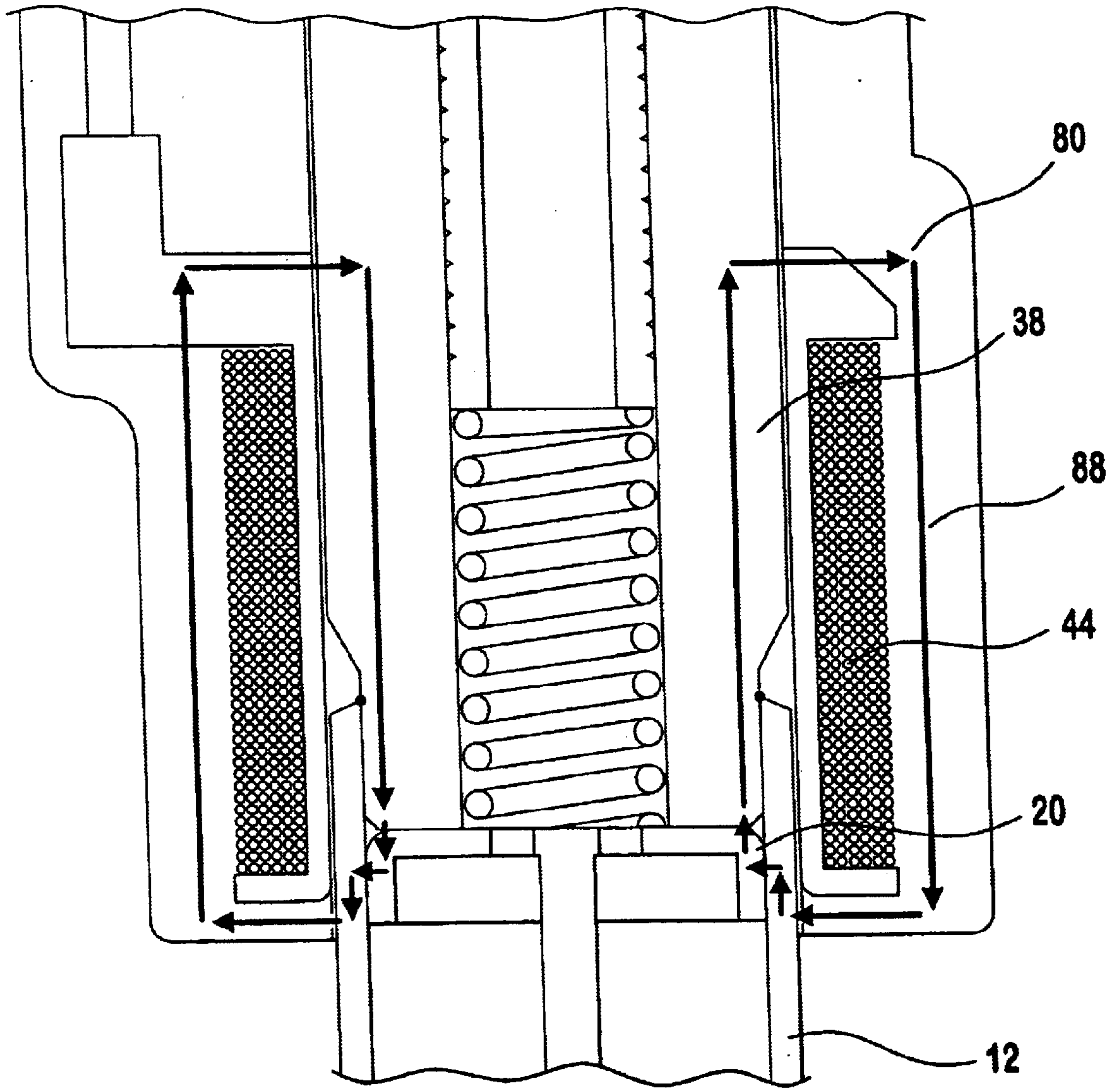
FIG. 7 is a side view, in section, of the flow of flux in the second preferred embodiment of the fuel injector assembly according to the present invention.

FIG. 7 shows the flow of flux 80 through the second preferred embodiment of the fuel injector 100. The coil 44 generates the electromagnetic flux 80 that flows from the inlet tube 38 across a coil air gap 88 to the valve body 12. The flux 80 then flows from the valve body 12, across the side air gap 17, to the armature/ball assembly 20, from the armature/ball assembly 20 across the working gap 15, back to the inlet tube 38.

It will be appreciated by those skilled in the art that changes could be made to the embodiments described above without departing from the broad inventive concept thereof. It is understood, therefore, that this invention is not limited to the particular embodiment disclosed, but is intended to cover modifications within the spirit and scope of the present invention as defined in the appended claims.

What is claimed is:

1. A method of manufacturing a fuel injector comprising:

welding an upper surface of a ball seat to a lower surface of a lower guide to form a welded ball seat and lower guide assembly, the welded ball seat and lower guide assembly providing a hermetic seal therebetween;

loading both an orifice disk and the welded ball seat and lower guide assembly into a downstream end of a valve body;

welding the valve body to the ball seat;

retaining the orifice disk in the downstream end of the valve body;

welding a ball to a downstream end of an armature stem forming an armature assembly;

loading the armature assembly through an upstream end of the valve body;

pressing an inlet tube into the valve body a predetermined distance;

welding the inlet tube directly to the valve body to provide a valve group assembly;

pressing a power group comprising a housing and a coil sub assembly onto the inlet tube of the valve group assembly;

retaining the power group to the inlet tube by sliding a plastic retainer through slots aligned in the power group and slots machined in the inlet tube;

installing first a spring, then second an adjusting tube, a predetermined distance into a top end of the inlet tube;

securing the adjusting tube in place after completing the installation; and pressing a combination retainer/fuel filter in an upstream end of the inlet tube.

2. The method of manufacturing a fuel injector according to claim 1, further comprising welding the orifice disk, ball seat and lower guide through an outside diameter of the downstream end of the valve body.

3. A method of manufacturing a fuel injector comprising:

pressing a power group assembly onto a valve group assembly, the power group assembly having an upstream end, downstream end, and a coil housing disposed therebetween, the upstream end including a first retention portion, the valve group assembly having a tube assembly extending between an inlet end and an outlet end along a longitudinal axis, the tube assembly including an inlet tube directly connected to a valve body, the tube assembly having a second retention portion; and securing the first retention portion of the power group assembly to the second retention portion of the valve group assembly via a retainer member.

4. The method of claim 3, wherein the pressing comprises:

loading an orifice disk, lower guide and seat into a downstream end of the valve body;

connecting the seat to the valve body;

inserting an armature/ball assembly into an upstream end of the valve body;

forming the tube assembly via the inlet tube connected to the upstream end of the valve body; and installing a spring and an adjusting tube into the tube assembly.

5. The method of claim 4, wherein the connecting comprises forming a weld through the valve body to the seat.

6. The method of claim 4, wherein the forming comprises welding the inlet tube into the upstream end of the valve body such that only one external hermetic weld is formed therebetween.

7. The method of claim 6, wherein the connecting comprises forming a weld extending through the valve body to the seat.

* * * * *